United States Patent
Pao et al.

(10) Patent No.: US 7,991,595 B2
(45) Date of Patent: Aug. 2, 2011

(54) ADAPTIVE REFINEMENT TOOLS FOR TETRAHEDRAL UNSTRUCTURED GRIDS

(75) Inventors: S. Paul Pao, Williamsburg, VA (US); Khaled S. Abdol-Hamid, Yorktown, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 359 days.

(21) Appl. No.: 12/138,768

(22) Filed: Jun. 13, 2008

(65) Prior Publication Data
US 2008/0312887 A1 Dec. 18, 2008

Related U.S. Application Data

(60) Provisional application No. 60/943,635, filed on Jun. 13, 2007.

(51) Int. Cl.
*G06F 17/50* (2006.01)
*G06F 19/00* (2006.01)

(52) U.S. Cl. ............... 703/2; 703/9; 345/419; 345/423; 382/118

(58) Field of Classification Search ............... 703/2, 6, 703/9; 345/419, 423; 382/118; 52/646
See application file for complete search history.

(56) References Cited

U.S. PATENT DOCUMENTS

| | | | |
|---|---|---|---|
| 4,711,062 A * | 12/1987 | Gwilliam et al. | 52/646 |
| 5,113,490 A * | 5/1992 | Winget | 345/419 |
| 5,603,188 A * | 2/1997 | Robbin | 52/81.1 |
| 5,617,322 A | 4/1997 | Yokota | |
| 5,768,156 A * | 6/1998 | Tautges et al. | 716/20 |
| 5,923,329 A | 7/1999 | Beale | |
| 6,088,521 A | 7/2000 | Strumolo et al. | |
| 6,356,860 B1 | 3/2002 | Barnette | |
| 6,445,390 B1 | 9/2002 | Aftosmis et al. | |
| 6,453,275 B1 | 9/2002 | Schoenmaker et al. | |
| 6,519,553 B1 | 2/2003 | Barnett et al. | |
| 6,654,710 B1 | 11/2003 | Keller | |
| 7,035,782 B2 | 4/2006 | Yang et al. | |
| 7,043,413 B2 | 5/2006 | Ward et al. | |
| 7,120,544 B2 | 10/2006 | Duncan | |
| 7,152,017 B2 | 12/2006 | Tanahashi et al. | |
| 7,200,532 B1 | 4/2007 | Cheng | |
| 7,339,584 B1 * | 3/2008 | Shepherd et al. | 345/423 |
| 2005/0172249 A1 * | 8/2005 | Juengling | 716/5 |
| 2005/0219445 A1 * | 10/2005 | Kubo | 349/110 |
| 2006/0025973 A1 | 2/2006 | Kim | |
| 2006/0058985 A1 | 3/2006 | Arslan et al. | |

(Continued)

FOREIGN PATENT DOCUMENTS

JP 2007190827 8/2007

(Continued)

*Primary Examiner* — Thai Phan
(74) *Attorney, Agent, or Firm* — Robin W. Edwards; Helen M. Galus

(57) ABSTRACT

An exemplary embodiment providing one or more improvements includes software which is robust, efficient, and has a very fast run time for user directed grid enrichment and flow solution adaptive grid refinement. All user selectable options (e.g., the choice of functions, the choice of thresholds, etc.), other than a pre-marked cell list, can be entered on the command line. The ease of application is an asset for flow physics research and preliminary design CFD analysis where fast grid modification is often needed to deal with unanticipated development of flow details.

15 Claims, 4 Drawing Sheets

U.S. PATENT DOCUMENTS

| | | | |
|---|---|---|---|
| 2006/0078172 A1* | 4/2006 | Zhang et al. | 382/118 |
| 2007/0239414 A1 | 10/2007 | Song et al. | |
| 2008/0015825 A1 | 1/2008 | Kalitzin et al. | |
| 2008/0103742 A1* | 5/2008 | Yu | 703/9 |
| 2008/0126046 A1* | 5/2008 | Yu | 703/9 |

FOREIGN PATENT DOCUMENTS

| | | |
|---|---|---|
| JP | 2007265459 | 10/2007 |

* cited by examiner

ADAPTIVE REFINEMENT TOOLS FOR TETRAHEDRAL UNSTRUCTURED GRIDS

CROSS-REFERENCE TO RELATED APPLICATIONS

This application claims priority from provisional application No. 60/943,635 filed Jun. 13, 2007.

ORIGIN OF THE INVENTION

The invention described herein was made by employees of the United States Government and may be manufactured and used by or for the Government for governmental purposes without payment of any royalties thereon or therefor.

BACKGROUND OF THE INVENTION

1. Field of the Invention

This disclosure relates to computer technology for implementing computational fluid dynamics analysis.

2. Description of the Related Art

Computational fluid dynamics (CFD) analysis is a complex technology involving strongly coupled non-linear partial differential equations which perform computations in a finite difference form supported by a discrete grid domain containing complex geometric shapes.

CFD analysis is often applied to flows typical of aerospace systems. Such flows often are characterized by the Mach number, which may range from 0 to 25. Such flows often have high Reynolds numbers resulting in regions of laminar flow becoming turbulent flow. Boundary layers are created by flows along body and inlet surfaces. Internal flows may have adverse pressure gradients. Shock waves, accompanied by separation of the boundary layer, may be present at transonic, supersonic and hypersonic speeds. Real gas effects may become important at hypersonic Mach numbers. The geometry of the system may be complex and unsteady flow may be present.

The efficacy of the CFD analysis depends on the manner of subdivision of the three-dimensional space. The numerical approximation of the Navier-Stokes equation contains errors that depend on the local density of tetrahedral subdivision and the local flow situation. Often times, deficiency of density distribution in the space is known only after the completion of a CFD analysis. Practitioners of the art have long desired to have an accurate, fast, and robust tool to modify the grid by h-refinement or some other means. However, modern computational mesh may contain more than 100 million cells. It is a monumental task for practitioners of the art to analyze both the solution and the mesh to decide where and how to perform mesh refinement efficiently within a reasonable amount of time and with a reasonable amount of effort.

Another impediment to applying the h-refinement procedure for advanced CFD analysis is that the conventional method of refinement subdivides each targeted cell into eight parts. Should refinement be required again at the location of the original cell, two steps of division would result in 64 parts, an unwieldy number. To make matters worse, the rules for grid integrity would require the subdivision of neighboring cells into eight, four, or two parts at each step of h-refinement.

The foregoing examples of the related art and limitations related therewith are intended to be illustrative and not exclusive. Other limitations of the related art will become apparent to those of skill in the art upon a reading of the specification and a study of the drawings.

Embodiments of the present disclosure meet the long-felt need for an accurate, fast, and robust tool to modify the grid by h-refinement.

SUMMARY OF THE INVENTION

In accordance with the present invention, a naturally occurring structure is recognized for the first time to facilitate cell subdivision into only two parts at each step. This naturally occurring structure has been termed herein a "pinwheel" and is comprised of a group of neighboring cells sharing only one common edge (as explained more fully below). At each h-refinement step, all cells in a pinwheel are partitioned each into two pas, with this partitioning occurring in preferred directions selected by the CFD practitioner. For example, the practitioner may choose directions with the highest local gradient of a flow quantity. Additionally, in accordance with the present invention, such subdivision of each pinwheel does not propagate to contiguous cells or pinwheels. This feature maintains grid integrity. Only the cells meeting desirable requirements of the CFD practitioner are divided, achieving the highest degree of functionality and having the economy of adding the least number of cells at each step. The pinwheel representation of the tetrahedral grid domain is complete and exhaustive because a pinwheel is associated with each edge, and edges are wherever a tetrahedral cell exists in the grid domain.

Additionally, the present invention will permit the practitioner to break up the large cells multiple times by repeated applications of this adaptive process.

Such embodiments of the present invention provide the benefit of robustness, economy of minimum cell addition, and very fast run time for user directed grid enrichment and flow solution adaptive grid refinement.

The following embodiments and aspects thereof are described and illustrated in conjunction with systems, tool, and methods which are meant to be exemplary and illustrative, not limiting in scope. In various embodiments, one or more of the above-described problems have been reduced or eliminated, while other embodiments are directed to other improvements, as will be apparent to those of skill in the art upon a reading of the specification and a study of the drawings.

The novel abilities and features of the embodiments of the present invention can also include placing the flow functions (e.g., flow quantity, pressure, velocity, turbulence, etc.) in the inventive code for instant access by the user, as well as allowing the user to select the function values or gradients to suit their particular applications without hindrance because the function set can contain all common CFD physical functions represented by the Navier-Stokes equation.

In accordance with the present invention, innovative numerical filtering algorithms are used in embodiments of the code to relieve the practitioner of the art from the time-consuming chores of performing calculations of statistical distribution of the flow function and then setting the h-refinement threshold amongst millions of tetrahedral cells. The fast and compact algorithms that are critical to the success of the h-refinement process do not exist outside of the inventive embodiments. The present invention automatically determines the adaptation numerical threshold for the selected flow function(s). For example, the practitioner may simply request to divide a certain percentage of the eligible cells (e.g., the top five percent), and the inventive code will automatically determine the correct numerical threshold for adaptation (or division) for the chosen function(s).

Embodiments of the present invention create a unique relational database for quickly identifying the edges and cells for division. The cell division process will not be efficient or robust without this unique relational database. This database recognizes a structure in the tetrahedral unstructured mesh, herein termed a "pinwheel."

In the edge selection process based on the functions selected by the practitioners of the art, only the pole-edge (as defined and explained below) will be divided if the functional value within a pinwheel exceeds the threshold for adaptation (and this pinwheel is chosen for division). As a result, all selected cells are divided into only two, not four or eight as in other known methods which do not recognize the pinwheel structure in the tetrahedrons unstructured mesh.

Dividing a cell by only a factor of two has tremendous significance in practical applications of h-refinement. It allows the practitioners of the art to perform repeated adaptation without a huge increase in the final size of the computational grid, and the cells are divided only in regions where such division is warranted because the division does not propagate to the pinwheel's neighbors.

In addition to the exemplary aspects and embodiments described above, further aspects and embodiments of the present invention will become apparent by reference to the drawings and by study of the following descriptions.

DETAILED DESCRIPTION OF THE INVENTION

In embodiments of the present disclosure, the following terms have the indicated meanings. "Tetrahedral Cell" means a volume element in space bound by four vertices, six edges, and four triangular surfaces. "Tetrahedral Unstructured Grid" means a discretization of a three-dimensional volume of space in which the elementary units are tetrahedral cells. The organization of the tetrahedral cells in the grid follows a strict set of geometrical rules. "h-refinement" means a grid refinement by dividing existing cells into two, four, eight cells of the same geometric type, for example, tetrahedrons. "Pinwheel" means a feature in the tetrahedral mesh formed by all cells attached to a single edge (see FIG. 2). "Pole-edge" means the common edge for all the cells in a pinwheel.

Embodiments of the present invention have been written in standard Fortran-90 language. They can be complied and run on any Unix or Linux computer platform. Embodiments also can be adapted to run on a personal computer (PC) platform if desirable, or can be written in other languages, or for other platforms. Two versions of the code using different methodologies have been written to ensure reliable operation.

The novel features of the present code can include a very large collection of user selectable options, a very fast execution time with run time almost linearly scalable to the number of cells in the grid by construction of a unique internal database, the utilization of the pinwheel structure for cell partition into only two parts and without propagation of cell division outside of the pinwheel, grid integrity requirements being automatically satisfied (i.e., the known rules of grid integrity); an easy to understand syntax with input on the command line; and automation of grid modification, after preliminary CFD solutions are obtained.

Figure 1:
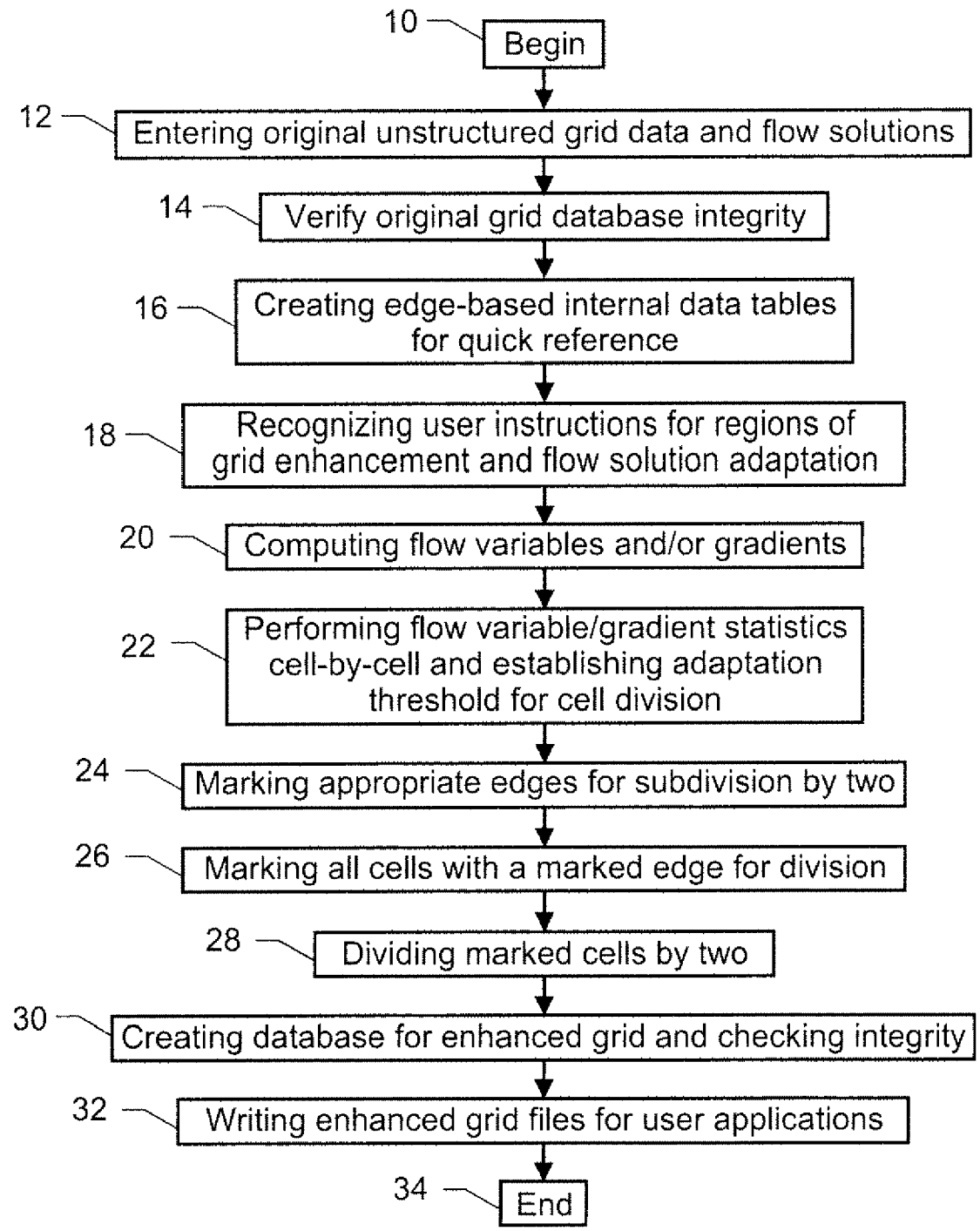
FIG. 1 is a flow chart of one embodiment showing the steps involved in generating the grid files for user applications.

FIG. 1 is a flow chart of one embodiment of the present invention showing the steps involved in generating the grid files for user applications.

In step 10 the user begins by choosing one of the three main branches of the code for adding grid. That is to say, the user chooses to add grid either according to a given list of cells, or in prescribed spatial domains, or by adaptive addition of cells according to flow functions. The implementation of the third option, the adaptive addition of cells according to flow function, includes all the steps in FIG. 1.

In step 12 the user indicated groups of files for grid geometry and solutions are transferred to computer memory.

In step 14, the original grid database integrity according to established rules for grid connectivity between points, edges, and cells are verified.

In step 16, innovative internal relational databases (e.g., tables) for accurate and fast execution of h-refinement according to user instructions are created. The creation, utilization, and the completeness of these internal relational databases are unique to the present invention (see FIG. 4, and its description below, for further details of these tables.).

In step 18, the user instructions are decoded and organized according to easy-to-use and easy-to-remember syntax. A to-do list is generated for performing the requested h-refinement.

In step 20, user requested flow variables from the five (expandable to seven or more, depending on physical composition of the fluid) primitive variables in the flow solution (however, other combinations can also be derived) are generated. Values of flow variables are associated with each cell, which are in turn transferable to edges and points in the grid.

In step 22 flow variable and gradient statistics for the values of each function are calculated and set an adaptation threshold for all cells and edges. (see, FIG. 5 and its description below, for additional details)

In step 24 all the edges in the grid are examined and all edges which have functional values exceeding the threshold are marked. Within a small neighborhood of contiguous cells, the highest ranked marked edge is chosen as a "pole edge" around which a pin wheel is defined (and any other marked edges in the pinwheel are now "unmarked"). This is done repeatedly in the process until all qualified edges are exhausted (see, FIG. 5 and its description below, for further details).

In step 26 all cells with one marked edge (the pole edges) are marked for division.

In step 28 each marked cell is divided by two.

In step 30 a new database is created for the adapted grid and the database is checked for integrity according to the same rules as in step 14.

In step 32 the new grid is written into a set of files.

In step 34 the user is provided a summary of the results, for example, the statistics of the process, a new grid, and a new solution file with data corresponding to the new grid. If desired, the user can perform repeated adaptation from step 12 to further divide cells using the new grid and the new solution.

It should be noted that if in step 10 the user chooses to add grid either according to a given list of cells, or in prescribed spatial domains (rather than by adaptive addition of cells according to flow functions) then only steps 10, 12, 16, 30, 32 and 34 would apply.

Figure 2:
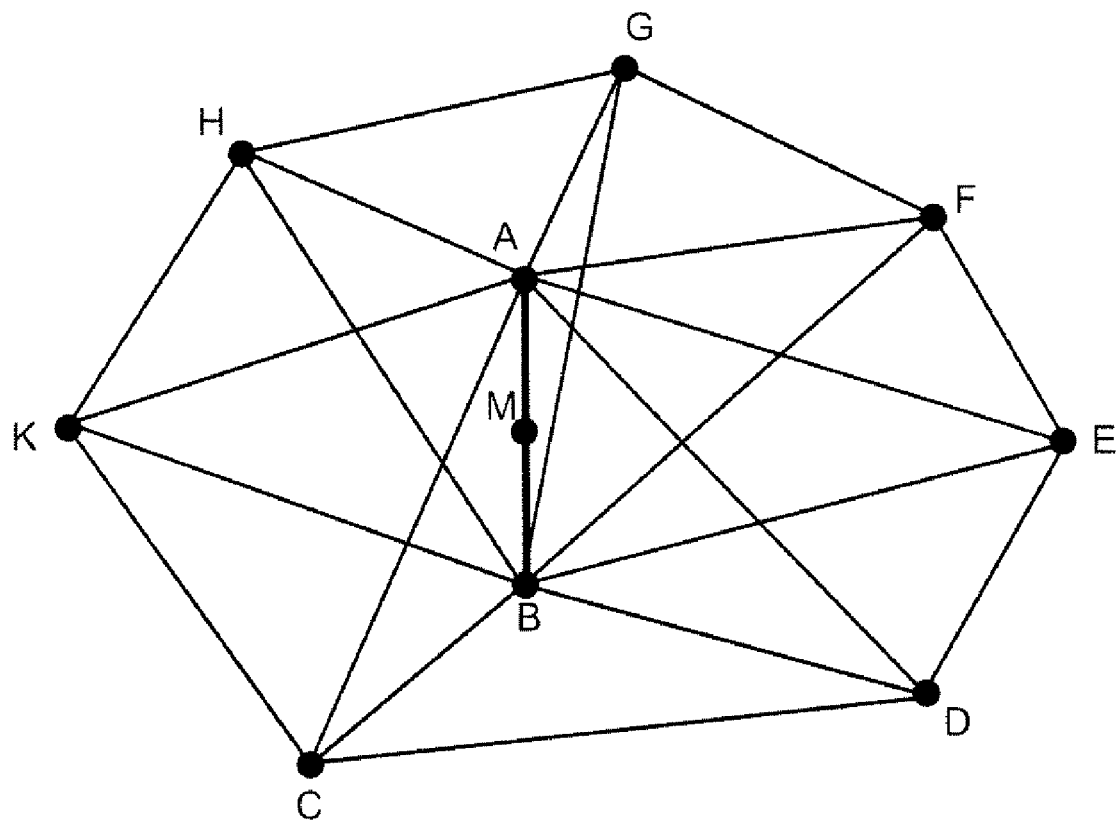
FIG. 2 is a diagrammatic depiction of a pinwheel containing seven tetrahedrons.

FIG. 2 is a diagrammatic depiction of a pinwheel containing seven tetrahedron cells. The tetrahedrons represented are described by the lettered points; ABCD, ABDE, ABEF, ABFG, ABGH, ABHK, and ABKC. Division of the edge AB by midpoint M results in the division of each tetrahedron into two tetrahedrons.

Figure 3:
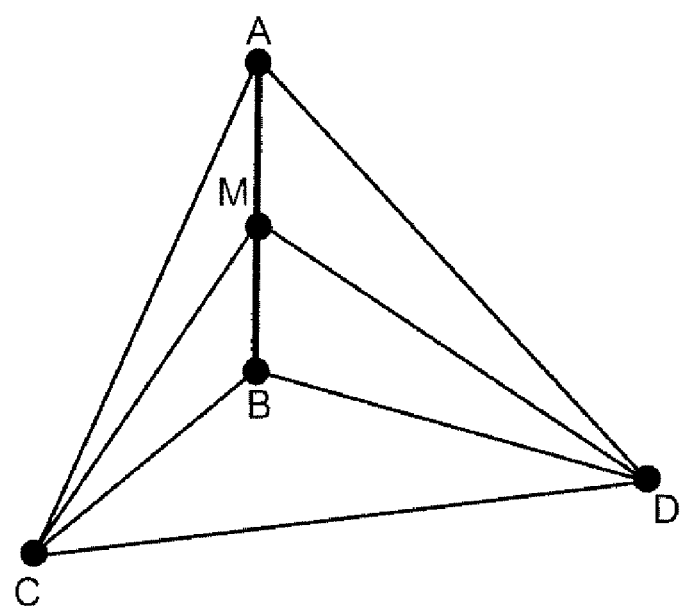
FIG. 3 is a diagrammatic depiction of the division of an edge of a tetrahedron resulting in two new tetrahedrons.

FIG. 3 is a diagrammatic depiction of the division of an edge of a tetrahedron cell resulting in two new tetrahedron cells. Edge AB is divided into by mid-point M. The original tetrahedron ABCD is thereby divided into smaller tetrahedrons AMCD and MBCD.

Figure 4:
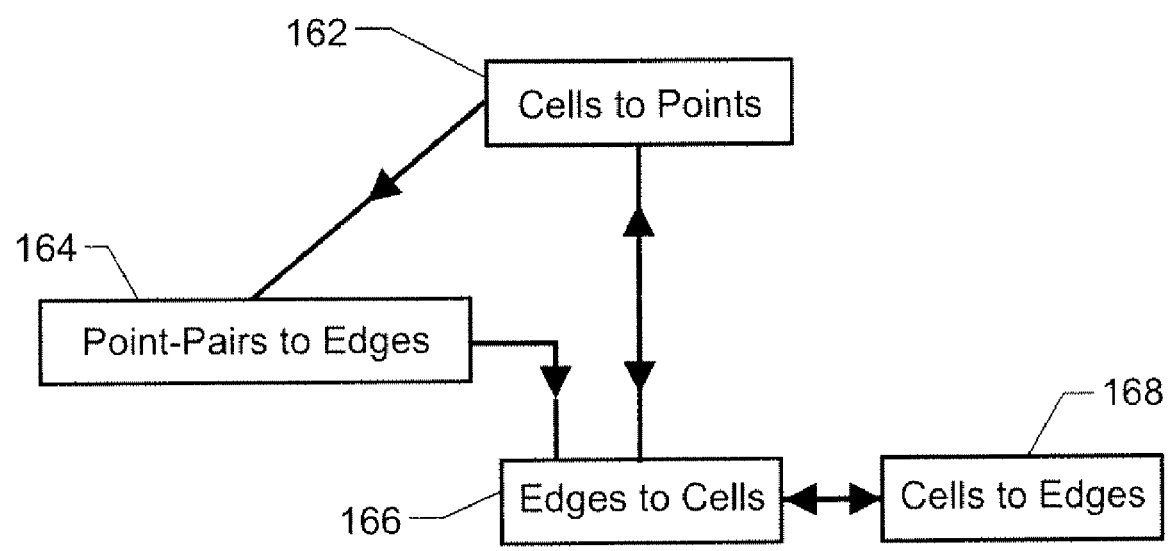
FIG. 4 is a flow chart showing the databases and tables included in step 16 in FIG. 1.

FIG. 4 is a flow chart showing the databases and tables included in step 16 in FIG. 1. These four tables are linearly scalable and form the core of the internal high-speed search engine. In the original grid file, point and cell identities are sequential numbers determined as parts of the original grid generation process. In the embodiments of this software, each edge is given a unique identity number. Three tables are created to represent a complete relational databases to link points to edges, edges to cells, cells to edges, and edges to points Box 162 entitled Cell-to-Points is a table of the original grid files.

Box 164 entitled Point-Pairs-to-Edge is a database arranged in sequential order. Each cell has six edges, and each edge has two end points. Each edge has a higher and a lower end-point identification number. The sequential order arrangement uses the higher number first, and then the lower number. In a first pass of the edge identification process, the embodiments count the numbers of edges having the same higher point number, and assigns sufficient space to accommodate all such edges in the edge table. In a second pass, all edges with the same high identification number are placed as a group within the assigned space in order of appearance into the table, the table item number for each edge becomes the unique identification number of each edge.

Box 166 entitled Edges-to-Cell is a table which allows quick search of pinwheels by the process of two steps. The first step creates a list of cell identification numbers in which all cell identifications related to a given edge are placed contiguously in the list. The second step creates a table of location keys and the number of attached cells for each edge. When the inventive code selects an edge and then needs to know all of the cells attached to it, the table can instantly provide the location of the cell group and provide all the cell identification numbers related to this edge.

Box 168 entitled Cells-to-Edges identifies the six edges of each cell which allows quick processing. The cells-to-edges table is novel to the disclosed inventive process. This new table, arranged in the order of the cell identity numbers, provides the identities of the six edges of each cell. The cell-to-edges-table facilitates instant access whenever the grid adaptation process requires such information for a cell. The four tables (cells-to-point, point-pairs-to-edges, edges-to-cells, and cells-to-edges) utilized together is a novel feature for providing a complete roadmap for the present invention.

Figure 5:
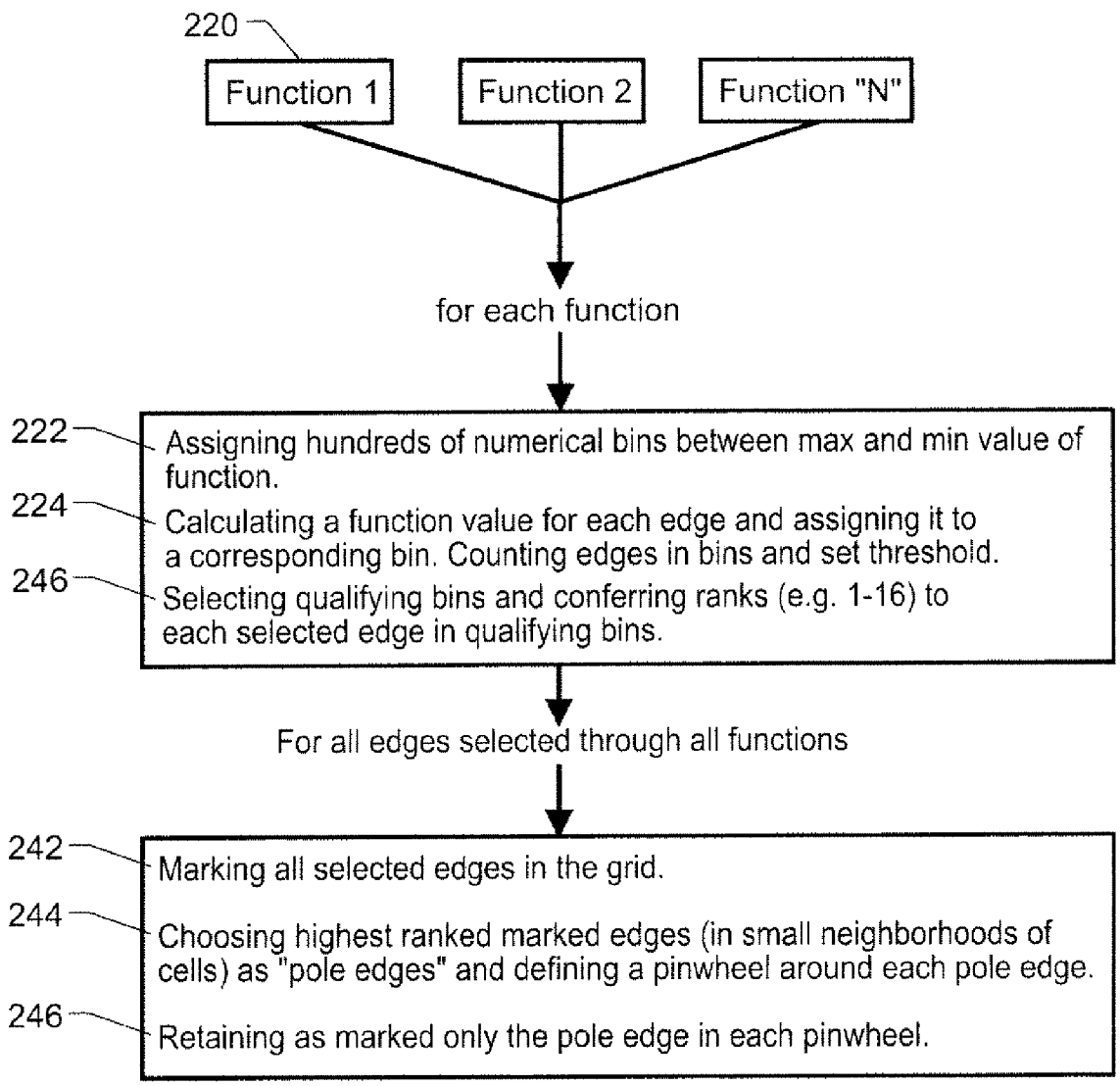
FIG. 5 is a flow chart showing the steps included in steps 22 and 24 in FIG. 1.

FIG. 5 is a flow chart showing the substeps included in steps 22 and 24 in FIG. 1. Within step 22 the following substeps are performed: in substep 220, the practioner chooses one or more desired function that he or she wishes to analyze, for example, pressure, velocity, turbulence, etc; in substep 222 hundreds of numerical bins are assigned to each function, between the maximum and minimum value of each function; in substep 224 the code calculates a function value for each edge and assigns each edge to the corresponding bin. The process proceeds by scanning through all the bins and counting the number of occurrences for the function value(s) belonging to each bin. A threshold is set to select, in accordance with specifications by the user of this software, a percentage of the total number of edges that bear significant function values (e.g., excluding constant values in regions representing by background flow properties, and other similar situations) In subset 226, the inventive code determines the bins that contain edges that are above the threshold value and confers a rank on the edges, for example, between 1 through 16 according to how much the edge values have exceeded the threshold.

Substeps 224 and 226 are repeated through all the functions selected by the users in each application of this software. When an edge is qualified for adaptation under more than one function, the higher ranking amongst all qualifying functions is given to this edge.

Within step 24 the following substeps are performed: in substep 242 all edges selected for adaptation are marked in the grid; in subset 244, from a small neighborhood of contiguous cells the highest ranked marked edge is chosen as a "pole edge" around which a pinwheel is defined. This is done repeatedly in the process until all qualified edges in the entire grid are exhausted. In substep 246 only one highest ranking edge (the "pole edge") in each pinwheel is retained as marked for cell division, i.e., any other marked edge in a pinwheel is no longer "marked."

While a number of exemplary aspects and embodiments have been discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

What is claimed as new and desired to be secured by Letters Patent of the United States is:

1. A computer implemented method of computational fluid dynamics analysis comprising the steps:
   a. transferring into memory selected files for grid geometry and solutions,
   b. verifying grid database integrity,
   c. creating databases linking points to edges, edges to cells, and cells to edges,
   d. computing flow variables for each edge,
   e. computing flow variable and gradient statistics for each function and setting adaptation threshold for each edge,
   f. examining all edges in the grid and marking all edges having functional values exceeding threshold and ranking all such marked edges,
   g. defining pinwheel structures in the grid, and retaining the marking on only the edge common to all cells in each pinwheel, such that each pinwheel has only one marked edge,
   h. marking all cells containing one marked edge,
   i. dividing by two all marked cells, and
   j. creating database for enhanced grid and verifying database integrity.

2. The computer implemented method of computational fluid dynamics analysis of claim 1 wherein:
   said step f. further comprises ranking the marked edges, and
   said step g. further comprises choosing highest ranked marked edges as the common edge for all the cells in a pinwheel.

3. The computer implemented method of computational fluid dynamics analysis of claim 1 further comprising the step after step j.:

k. writing the enhanced grid into a set of files.

4. The computer implemented method of computational fluid dynamics analysis of claim 1 further comprising the step after step j.:

k. calculating and reporting statistics of the process.

5. The computer implemented method of computational fluid dynamics analysis of claim 1 wherein steps a. to j. are repeated using data from step j.

6. The computer implemented method of computational fluid dynamics analysis of claim 1 further comprising the step a'. preceding step a.:

a'. selecting a code branch for application modality.

7. A system for computational fluid dynamics analysis comprising:

means for transferring into memory selected files for grid geometry and solutions,
means for verifying grid database integrity,
means for creating databases linking points to edges, edges to cells, and cells to edges,
means for computing flow variables for each edge,
means for computing flow variable and gradient statistics for each function and setting adaptation threshold for each edge,
means for examining all edges in the grid and marking all edges with function values exceeding threshold;
means for selecting marked edges to define pinwheel structures in the grid, wherein each selected edge is common to all cells in its corresponding pinwheel, and unmarking any unselected edges in the pinwheels,
means for marking all cells containing one marked edge,
means for dividing by two all marked cells, and
means for creating database for enhanced grid and verifying database integrity.

8. The system for computational fluid dynamics analysis of claim 7 further comprising:

means for writing the enhanced grid into a set of files.

9. The system for computational fluid dynamics analysis of claim 7 further comprising:

means for calculating and reporting statistics of the process.

10. The system for computation fluid dynamics analysis of claim 7 wherein:

said means for examining and marking the edges comprises means for ranking the marked edges, and
said means for selecting and unmarking marked edges comprises means for choosing highly ranked marked edges as the selected edges for the common edge for all the cells in a pinwheel.

11. The system for computational fluid dynamics analysis of claim 7 further comprising:

means for selecting a code branch for application modality.

12. A computer implemented method for creating edge-based internal data tables in which each edge is given a unique identity number from grid files in which point and cell identities are sequentially numbered comprising the steps:

a. generating a table of all edges in-sequential order by examining all cells according to cell identification number in sequence, entering each edge into a table first according to the higher identification number of the two ends and the lower identification number is entered in order of appearance,
b. searching pinwheels formed by the cells by first placing all cell identifications related to a given edge contiguously in a list and creating a table of location key and the number of attached cells for each edge, and
c. identifying all edges of each cell by creating a table in the order of cell identify numbers.

13. A system for creating edge-based internal data tables in which each edge is given a unique identity number from grid files in which point and cell identities are sequential numbered, comprising:

means for generating a table of all edges in sequential order by examining all cells according to cell identification number in sequence, entering each edge into a table first according to the higher identification number of the two ends and the lower identification number is entered in order of appearance,
means for searching pinwheels formed by the cells by first placing all cell identifications related to a given edge contiguously in a list and creating a table of location key and the number of attached cells for each edge, and
means for identifying all edges of each cell by creating a table in the order of cell identify numbers.

14. A computer implemented method for selecting edges in a three-dimensional pinwheel for division comprising the steps:

a. selecting one or more functions for analysis,
b. assigning numerical bins between the maximum and minimum values of each function,
c. calculating a function value for each edge,
d. assigning each edge to the corresponding bin,
e. determining the number of edges within the bins which exceed a threshold, ranking each edge,
f. marking all edges selected for adaptation, and
g. selecting the highest ranking edge in each pinwheel for division.

15. A system for selecting edges for division in a three-dimensional pinwheel comprising:

means for selecting one or more functions for analysis,
means for assigning numerical bins between the maximum and minimum values of each function,
means for calculating a function value for each edge,
means for assigning each edge to the corresponding bin,
means for determining the number of edges within the bins which exceed a threshold, ranking each edge,
means for marking all edges selected for adaptation, and
means for selecting the highest ranking edge in each pinwheel for division.

\* \* \* \* \*